United States Patent
Kim et al.

(10) Patent No.: US 11,155,214 B2
(45) Date of Patent: Oct. 26, 2021

(54) ROOF RACK AND VEHICLE INCLUDING THE SAME

(71) Applicants: HYUNDAI MOTOR COMPANY, Seoul (KR); KIA MOTORS CORPORATION, Seoul (KR)

(72) Inventors: Hyun Kyung Kim, Hwaseong-si (KR); Dong Eun Cha, Hwaseong-si (KR); Jin Young Yoon, Gimpo-si (KR); Byung Kyu Yoon, Uiwang-si (KR); Hwi Sung Jung, Suwon-si (KR); Sang Hyeon Park, Seoul (KR); Ju Hyun Kwon, Seoul (KR); Seung Ryeol Lee, Seoul (KR); Yong Yeon Hwang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/881,455

(22) Filed: May 22, 2020

(65) Prior Publication Data
US 2020/0377031 A1 Dec. 3, 2020

(30) Foreign Application Priority Data

May 27, 2019 (KR) .................. 10-2019-0061996
Jun. 28, 2019 (KR) .................. 10-2019-0077768

(51) Int. Cl.
*B60R 9/058* (2006.01)

(52) U.S. Cl.
CPC .................. *B60R 9/058* (2013.01)

(58) Field of Classification Search
CPC .. B60R 9/058; B60R 9/04; B60R 9/00; B60R 9/045; B62D 65/16
See application file for complete search history.

(56) References Cited

U.S. PATENT DOCUMENTS

| | | | | |
|---|---|---|---|---|
| 4,274,570 A * | 6/1981 | Bott | ..................... | B60R 9/045 224/324 |
| 4,323,182 A * | 4/1982 | Bott | ..................... | B60R 9/045 224/321 |
| 4,428,517 A * | 1/1984 | Bott | ..................... | B60R 9/045 224/319 |
| 5,201,487 A * | 4/1993 | Epplett | ................ | B60R 9/058 224/309 |
| 5,306,156 A * | 4/1994 | Gibbs | ................. | B60Q 1/302 439/34 |
| 5,411,196 A * | 5/1995 | Lee, Jr. | .............. | B60P 7/135 224/315 |

(Continued)

FOREIGN PATENT DOCUMENTS

KR 20110019680 2/2011

*Primary Examiner* — Brian D Nash
(74) *Attorney, Agent, or Firm* — Morgan, Lewis & Bockius LLP

(57) ABSTRACT

A roof rack mounted on a roof panel of a vehicle includes a main body including a rail that extends along a lengthwise direction and forms the main body and support parts provided on opposite longitudinal end portions of the rail in the lengthwise direction, a hollow profile that extends along the lengthwise direction of the rail and that is integrally formed inside the rail, and a cap mounted on at least one of opposite longitudinal end portions of the hollow profile or disposed inside the main body.

14 Claims, 8 Drawing Sheets

(56) References Cited

U.S. PATENT DOCUMENTS

| | | | | |
|---|---|---|---|---|
| 5,511,708 A * | 4/1996 | Cronce | ............... | B60R 9/045 224/321 |
| 5,975,391 A * | 11/1999 | Aftanas | ............... | B60R 9/04 224/309 |
| 6,131,782 A * | 10/2000 | De Silva | ............... | B60R 9/045 224/315 |
| D434,364 S * | 11/2000 | Bauer | ............... | D12/412 |
| 6,974,181 B2 * | 12/2005 | Mikkaichi | ............... | B60R 13/04 296/210 |
| 6,997,657 B1 * | 2/2006 | Saward | ............... | B60R 9/045 224/315 |
| 9,187,047 B2 * | 11/2015 | Sautter | ............... | B60R 9/045 |
| 9,643,542 B2 * | 5/2017 | Aftanas | ............... | B60R 9/052 |
| 10,363,881 B2 * | 7/2019 | Wilks | ............... | B60R 9/048 |
| 2003/0080167 A1 * | 5/2003 | Kmita | ............... | B60R 9/00 224/321 |
| 2006/0060621 A1 * | 3/2006 | Klinkman | ............... | B60R 9/045 224/321 |
| 2006/0151553 A1 * | 7/2006 | Stapleton | ............... | B60R 9/04 224/326 |
| 2006/0163297 A1 * | 7/2006 | Moreau | ............... | B60R 9/045 224/321 |
| 2006/0283900 A1 * | 12/2006 | Stapleton | ............... | B60R 9/045 224/325 |
| 2007/0108243 A1 * | 5/2007 | Bingham | ............... | B60R 9/058 224/326 |
| 2008/0083800 A1 * | 4/2008 | Mathew | ............... | B60R 9/058 224/326 |
| 2008/0087059 A1 * | 4/2008 | Lee | ............... | B60R 9/04 70/258 |
| 2008/0121671 A1 * | 5/2008 | Cronce | ............... | B60R 9/058 224/331 |
| 2008/0197162 A1 * | 8/2008 | Klinkman | ............... | B60R 9/045 224/314 |
| 2012/0248164 A1 * | 10/2012 | Aftanas | ............... | B60R 9/058 224/309 |
| 2013/0068810 A1 * | 3/2013 | Garland | ............... | B60R 9/058 224/309 |
| 2014/0097218 A1 * | 4/2014 | Bittner | ............... | B60R 9/058 224/309 |
| 2014/0131406 A1 * | 5/2014 | Jutila | ............... | B60R 9/058 224/321 |
| 2015/0175082 A1 * | 6/2015 | Aftanas | ............... | B60R 9/058 224/309 |
| 2017/0015253 A1 * | 1/2017 | Shibata | ............... | B60R 9/04 |
| 2017/0320445 A1 * | 11/2017 | Aftanas | ............... | B60R 9/045 |
| 2018/0201200 A1 * | 7/2018 | Wang | ............... | B60R 9/045 |
| 2020/0247325 A1 * | 8/2020 | Jung | ............... | B60R 9/058 |
| 2020/0376728 A1 * | 12/2020 | Kim | ............... | B29C 45/2681 |
| 2020/0377026 A1 * | 12/2020 | Kim | ............... | B60R 9/04 |
| 2020/0377027 A1 * | 12/2020 | Kim | ............... | B60R 9/058 |
| 2020/0377164 A1 * | 12/2020 | Kim | ............... | B60R 9/04 |

* cited by examiner

ROOF RACK AND VEHICLE INCLUDING THE SAME

CROSS-REFERENCE TO RELATED APPLICATION

This application claims priority to and the benefit of Korean Patent Application Nos. 10-2019-0061996, filed on May 27, 2019 and 10-2019-0077768, filed on Jun. 28, 2019, the entire contents of which are incorporated herein by reference.

TECHNICAL FIELD

The present disclosure relates to a roof rack and a vehicle including the same.

BACKGROUND

The statements in this section merely provide background information related to the present disclosure and may not constitute prior art.

In general, roof racks are symmetrically mounted on opposite sides of a roof panel of a vehicle to load things on the top of the vehicle. One example of roof racks is disclosed in Korean Patent Publication No. 10-2011-0019680 (entitled "Side Bar Assembly of Roof Carrier for Vehicle").

However, the method of molding and assembling the separate objects has problems in that manufacturing costs rise and the number of assembly steps is increased. Furthermore, the rail made of an aluminum material may be easily deformed by an external impact due to its low strength.

SUMMARY

An aspect of the present disclosure provides a roof rack, in which a rail and support parts provided on opposite longitudinal end portions of the rail, which are assembled as separate objects in the related art, are molded into one main body through injection molding and a hollow profile having caps mounted on opposite longitudinal end portions thereof is integrally molded inside the main body to increase strength.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a roof rack mounted on a roof panel of a vehicle includes a main body including a rail that extends along a lengthwise direction and forms a body and support parts provided on opposite longitudinal end portions of the rail in the lengthwise direction, a hollow profile that extends along the lengthwise direction of the rail and that is integrally formed inside the rail, and a cap mounted on at least one of opposite longitudinal end portions of the hollow profile and disposed inside the main body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
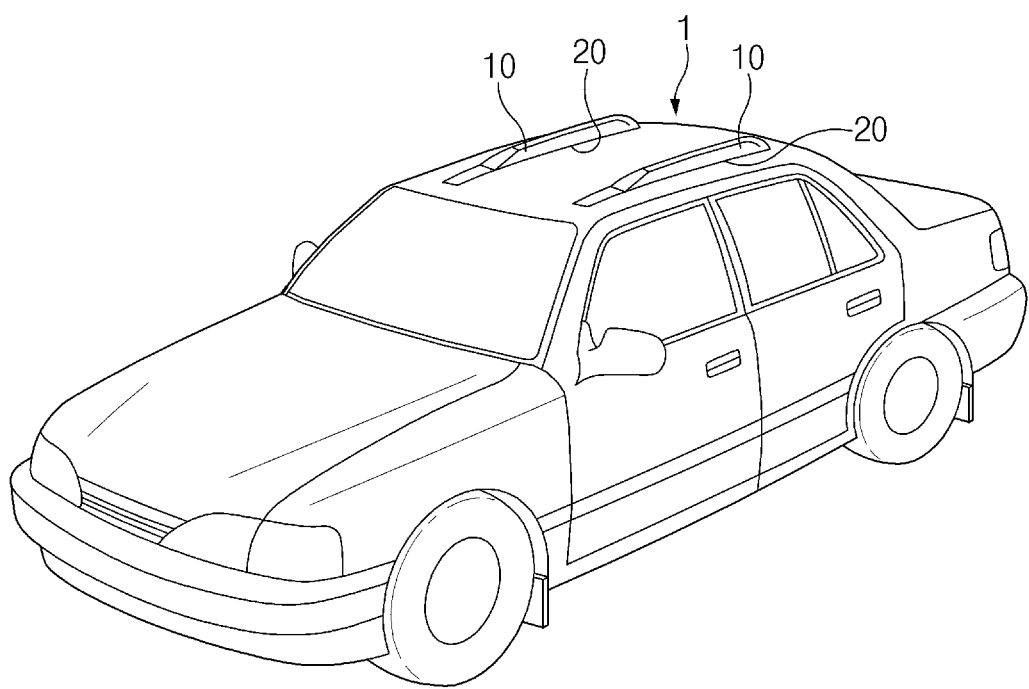
FIG. 1 is a view illustrating roof racks mounted on a roof panel of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to roof racks. The roof racks may be mounted on a roof panel of a vehicle. Specifically, the roof racks may be symmetrically mounted on opposite sides of the outer surface of the roof panel of the vehicle.

Hereinafter, forms of the present disclosure will be described in detail with reference to the accompanying drawings such that those skilled in the art to which the present disclosure pertains can readily carry out the present disclosure. However, the present disclosure may be implemented in various different forms and is not limited to the forms described herein. In drawings, components irrelevant to the description are omitted for the simplicity of explanation, and like reference numerals denote like components through the entire specification.

FIG. 1 is a view illustrating roof racks mounted on a roof panel of a vehicle. In FIG. 1, a roof rack 10 is fixedly installed through a fastening member (not illustrated) in a state in which a rail 11 extending along a lengthwise direction and forming a main body is mounted on a roof 1 of a vehicle.

The roof rack 10 in the related art includes the rail 11, stanchions 12 provided on opposite longitudinal end portions of the rail 11, covers 13, and pads 14. The rail 11 having a uniform cross-sectional shape is extruded of an aluminum material, and the stanchions 12 made of a synthetic resin are injection molded due to the nature of a three-dimensional curved surface shape thereof.

Figure 2:
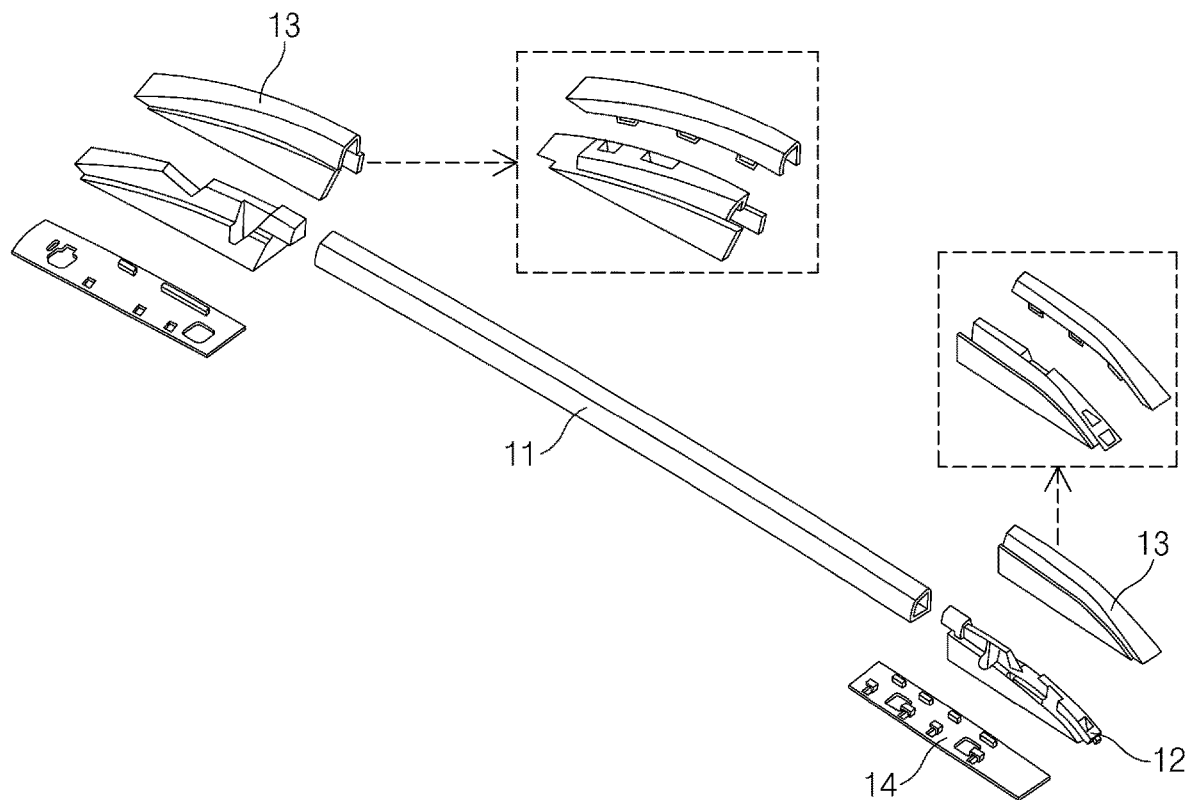
FIG. 2 is a view illustrating a configuration of the roof rack.

FIG. 2 is a view illustrating a configuration of the roof rack.

More specifically, the rail 11, the stanchions 12, the covers 13, and the pads 14 of the roof rack 10 in the related art are molded as separate objects and then assembled by a fitting method.

Figure 3:
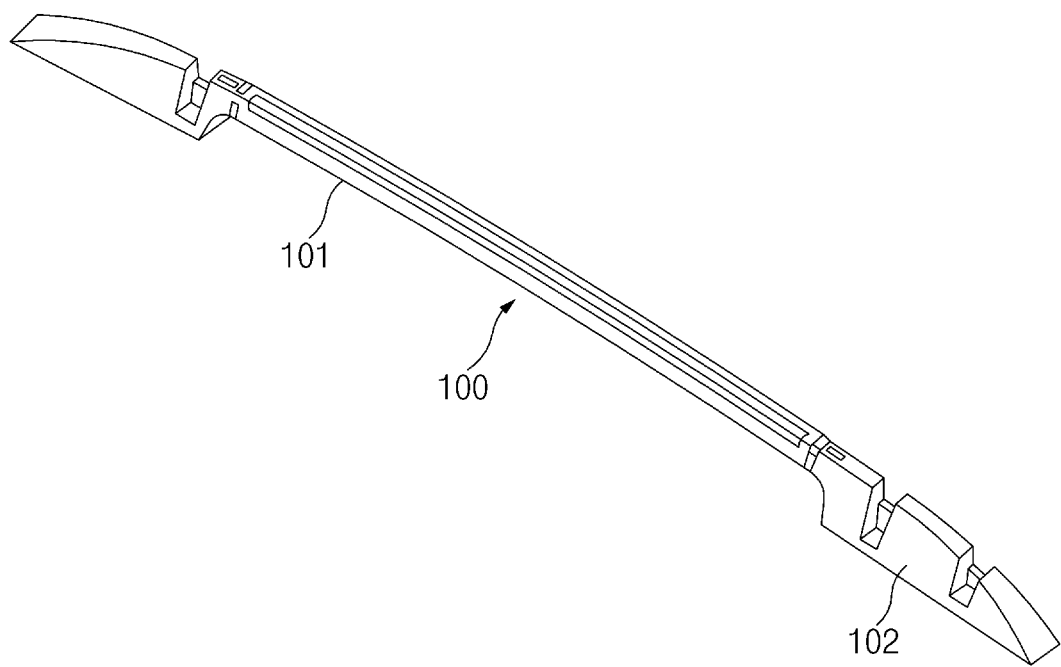
FIG. 3 is a view illustrating a configuration of an exemplary roof rack in one form of the present disclosure.
Figure 4:
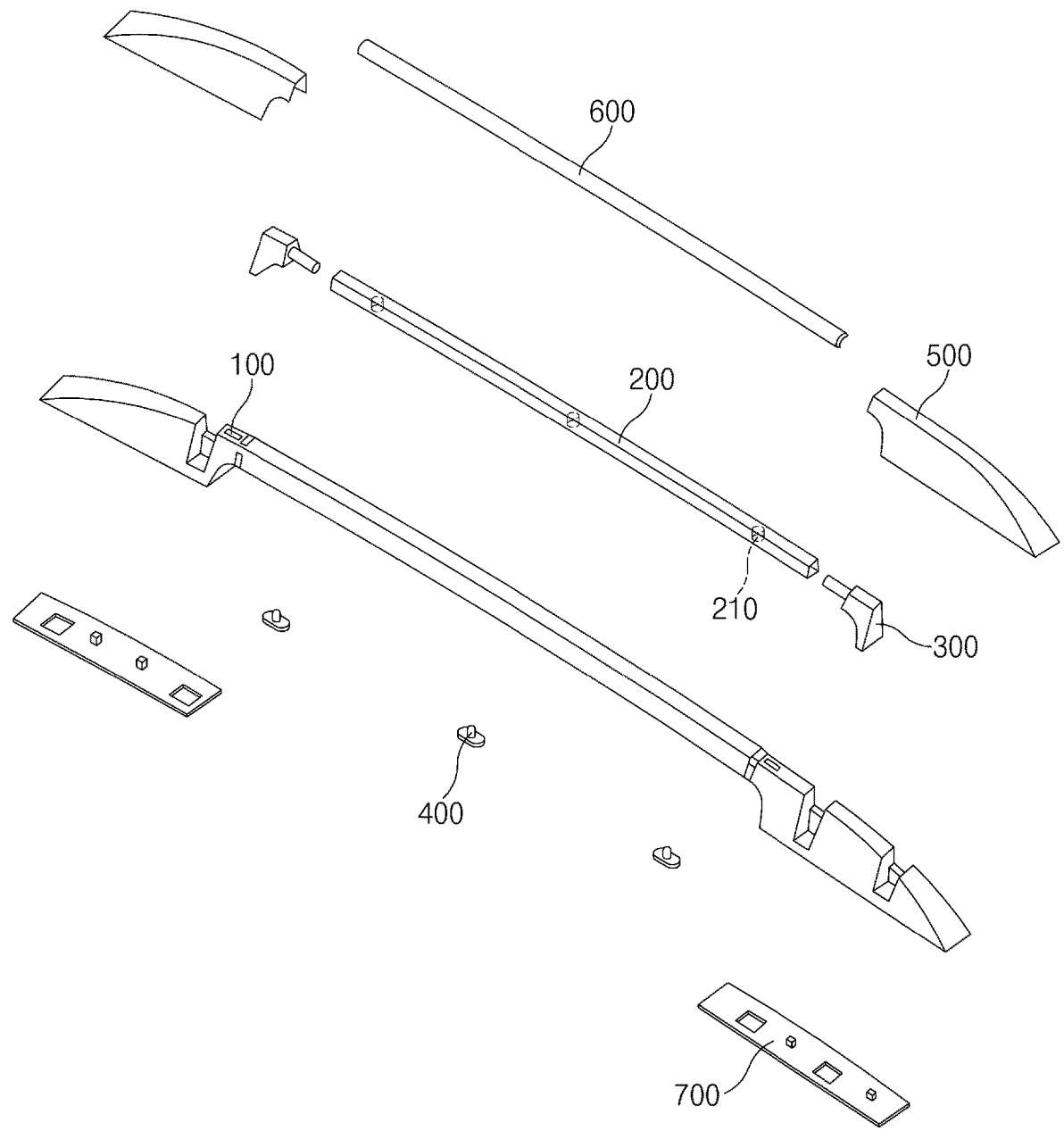
FIG. 4 is a detailed exploded perspective view of the exemplary roof rack in one form of the present disclosure.

FIG. 3 is a view illustrating a configuration of an exemplary roof rack according to the present disclosure. FIG. 4 is a detailed exploded perspective view of the exemplary roof rack according to the present disclosure.

Referring to FIGS. 3 and 4, the roof rack according to the present disclosure includes a main body 100, a hollow profile 200, and a cap 300.

The main body 100 includes a rail 101 and support parts 102. The rail 101 extends along a lengthwise direction and forms a body, and the support parts 102 are provided on opposite longitudinal end portions of the rail 101 in the lengthwise direction. For example, the support parts 102 may be integrally formed on the opposite longitudinal end portions of the rail 101 through injection molding. Specifically, the main body 100 may be simultaneously molded with the hollow profile 200 through insert molding. As the main body 100 and the hollow profile 200 of the roof rack according to the present disclosure are integrally molded by insert molding, the number of processes (assembly/production) may be simplified, and thus manufacturing costs may be reduced. In addition, the roof rack manufactured by insert molding may have a high design degree of freedom and may have a luxurious appearance.

The hollow profile 200 extends along the lengthwise direction of the rail 101 and is integrally formed inside the rail 101. In other words, the rail 101 may contain a hollow portion extending along the lengthwise direction, and inner surfaces of the rail 101 that form the hollow portion may make contact with the entire area of an outer surface of the hollow profile 200. As the entire area of the outer surface of the hollow profile 200 is brought into contact with the inner surfaces of the rail 101, the strength of the main body 100 may be improved. The hollow profile 200 may have a rod shape having a hollow portion (an interior space) along the lengthwise direction. Furthermore, the length of the hollow profile 200 may be equal to or shorter than the length of the rail 101. Because the hollow profile 200 is integrally formed inside the rail 101 through insert molding as described above, the hollow profile 200 herein may be an insert member.

Meanwhile, the hollow profile 200 may be manufactured by injection molding. For example, the hollow profile 200 may be manufactured by extrusion or drawing. The thickness of the hollow profile 200 is not specially limited and may be variably adjusted depending on a process condition of injection molding.

The cap 300 may be mounted on at least one of opposite longitudinal end portions of the hollow profile 200 and may be disposed inside the main body 100. For example, the caps 300 may be mounted on the opposite longitudinal end portions of the hollow profile 200 to seal the interior space of the hollow profile 200. The hollow profile 200 may be insert-molded, with the caps 300 mounted on the opposite longitudinal end portions of the hollow profile 200. As the caps 300 are insert-molded in the state of being mounted on the opposite longitudinal end portions of the hollow profile 200, the caps 300 may be disposed inside the main body 100 and may not be visible from outside the roof rack. As the caps 300 seal the interior space of the hollow profile 200, the caps 300 serve to inhibit the moldable material of the rail 101 from being introduced into the interior space of the hollow profile 200 during insert molding. Furthermore, the size of the caps 300 may be greater than the diameter of the hollow profile 200. Here, the size of the caps 300 refers to a length in the longest dimension. As the caps 300 are formed to have a size larger than the diameter of the hollow profile 200, a coupling force between the main body 100 and the hollow profile 200 may be improved, and thus the hollow profile 200 may be prevented from being separated from the main body 100 when an external impact is applied. Furthermore, the caps 300 may contribute to improving the settlement of the hollow profile 200 in an insert molding apparatus (e.g., an injection mold) during insert molding.

In some forms of the present disclosure, the hollow profile 200 may have one or more through-holes 210 formed in one surface thereof that faces the roof panel of the vehicle. The through-holes 210 may be mounted on fixing members (fixing pins) provided in the insert molding apparatus. The molding position of the hollow profile 200 in the insert molding apparatus may be arranged and fixed by the through-holes 210. As the through-holes 210 are mounted on the fixing members provided in the insert molding apparatus, the hollow profile 200 may be prevented from being separated from the initially set molding position by a flow of a moldable material, and thus an insert defect rate may be minimized. For example, two or more through-holes 210 may be symmetrically formed on opposite longitudinal end portions of the surface of the hollow profile 200 that faces the roof panel of the vehicle.

Furthermore, the roof rack according to the present disclosure may further include stoppers 400 coupled to the through-holes 210. Although the through-holes 210 contribute to fixing the position of the hollow profile 200 in an injection molding process, the through-holes 210 may correspond to vulnerable parts of the appearance of the final product. As the stoppers 400 are coupled to the through-holes 210, the stoppers 400 serve to hide the vulnerable parts of the appearance of the roof rack. The stoppers 400 coupled to the through-holes 210 may be located to face the roof panel of the vehicle, and thus appearance vulnerability of the roof rack due to the stoppers 400 does not occur.

Figure 5:
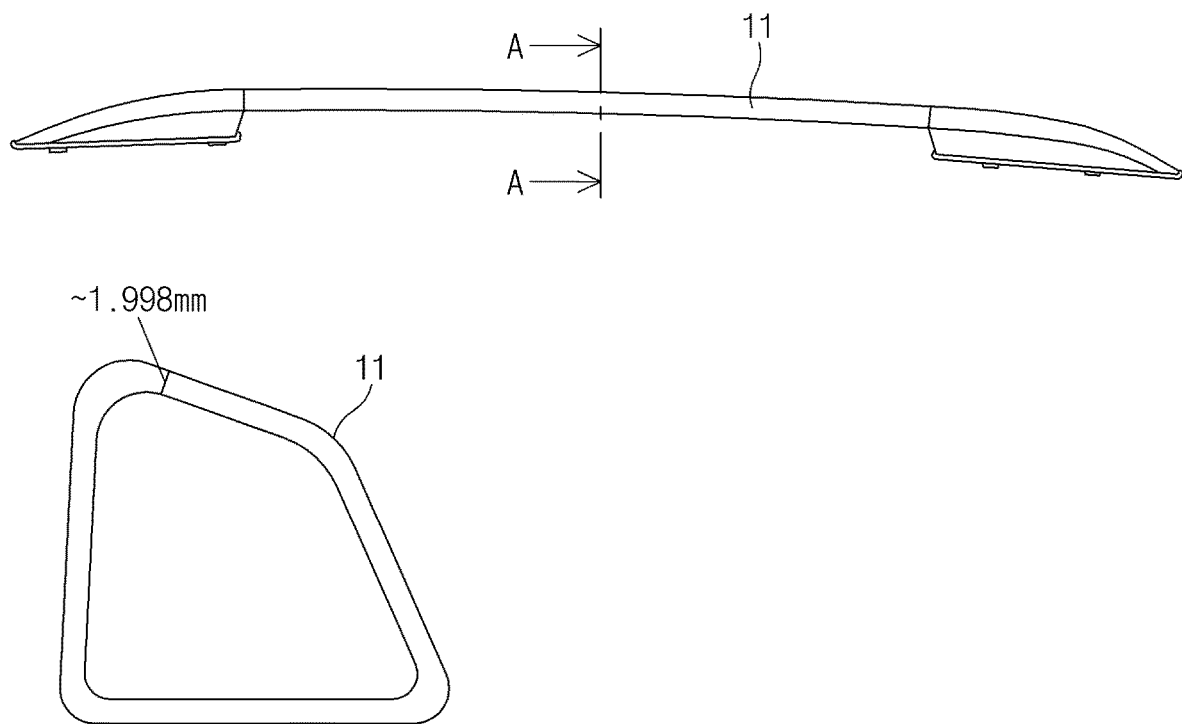
FIG. 5 illustrates the conventional roof rack and a cross-section of a rail when the roof rack is cut with cutting plane A-A.
Figure 6:
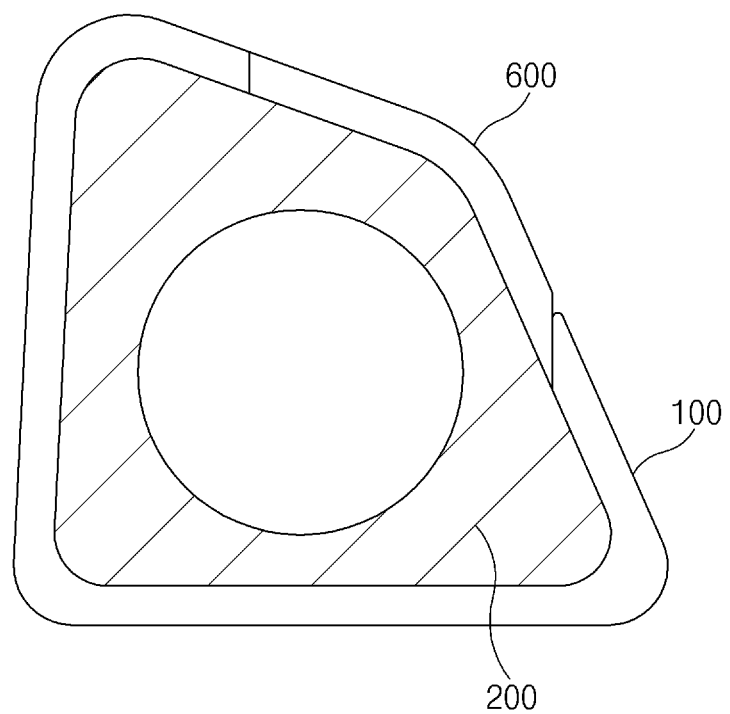
FIGS. 6 to 8 illustrate cross-sections of a main body when the exemplary roof rack in one form of the present disclosure is cut with cutting plane A-A illustrated in FIG. 5.
Figure 7:
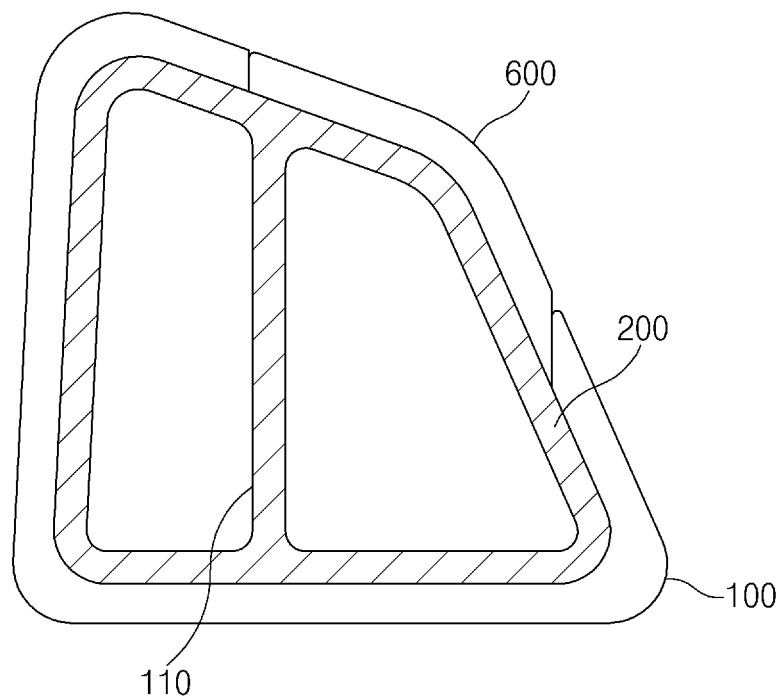
Figure 8:
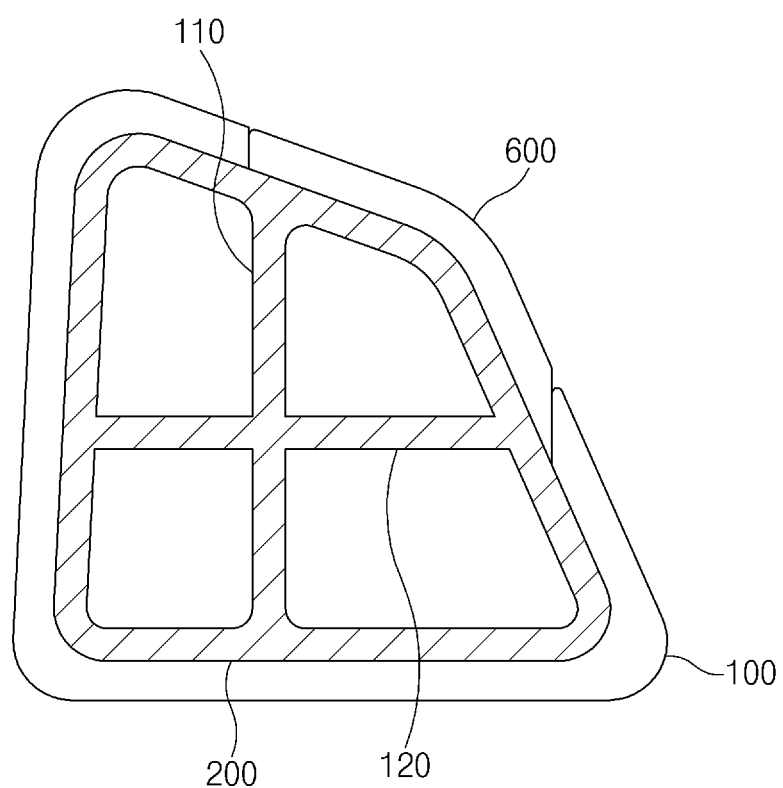

FIG. 5 illustrates the conventional roof rack and a cross-section of the rail when the roof rack is cut with cutting plane A-A. FIGS. 6 to 8 illustrate cross-sections of the main body when the exemplary roof rack according to the present disclosure is cut with cutting plane A-A illustrated in FIG. 5.

Unlike the conventional roof rack, the hollow profile 200 of the roof rack according to the present disclosure may be implemented in various cross-sectional shapes through extrusion or drawing. For example, the hollow profile 200 may have a circular cross-section (refer to FIG. 6) or a grid-shaped cross-section (refer to FIGS. 7 and 8).

In some forms of the present disclosure, the hollow profile 200 may include at least one rib such that the interior space is divided into at least two spaces along the lengthwise direction. The interior space of the hollow profile 200 may be divided into two, three, four or more spaces depending on the number of ribs. In this case, the hollow profile 200 may have a grid-shaped cross-section.

Referring to FIGS. 7 and 8, the roof rack according to the present disclosure may have a straight rib cross-section when one rib is formed and may have a cross rib cross-section when two ribs are formed to cross each other.

Specifically, the rib may extend along the lengthwise direction of the hollow profile 200 and may be connected to inner surfaces of the hollow profile 200 across the interior space of the hollow profile 200 along a width or height direction of the hollow profile 200. As the rib is connected to the inner surfaces of the hollow profile 200 across the interior space of the hollow profile 200, the strength of the hollow profile 200 may be improved. The rib may be integrally formed inside the hollow profile 200 by extrusion or drawing.

In some forms of the present disclosure, the hollow profile 200 may include a first rib 110 that extends along the lengthwise direction of the hollow profile 200 and that is connected to the inner surfaces of the hollow profile 200 across the interior space of the hollow profile 200 along the width direction and a second rib 120 that extends along the lengthwise direction of the hollow profile 200 and that is connected to the inner surfaces of the hollow profile 200 across the interior space of the hollow profile 200 along the height direction.

The first rib 110 and the second rib 120 may be connected to the inner surfaces of the hollow profile 200 in the state of being disposed at a right angle. The term "right angle" used herein may be used as a meaning including an angle of 60° to 120° as well as 90° that is a mathematical concept. The first rib 110 and the second rib 120 may be integrated with each other to form a cross rib. The interior space of the hollow profile 200 including the first rib 110 and the second rib 120 may be divided into four spaces.

In some forms of the present disclosure, the roof rack according to the present disclosure may further include pads 700 provided between the support parts 102 and the roof panel of the vehicle. The pads 700 may function to prevent surfaces of the support parts 102 that face the roof panel of the vehicle from making direct contact with the surface of the roof panel of the vehicle, thereby minimizing damage to the surface of the roof panel of the vehicle and suppressing occurrence of noise due to aerodynamic force and assembly clearance. The support parts 102 and the pads 700 may be fastened with each other through various fastening members, or may be assembled together by a fitting method.

In some forms of the present disclosure, the roof rack according to the present disclosure may further include covers 500 that cover the support parts 102. The covers 500 may serve to hide vulnerable parts of the appearances of the support parts 102, and the shape of the covers 500 is not specially limited.

In some forms of the present disclosure, the rail 101 may have an opening in a partial area thereof, the hollow profile 200 may be exposed to the outside through the opening, and the covering member 600 may be mounted in the opening to cover the hollow profile 200. For example, the covering member 600 may have a different color from the main body 100, or may have an LED mounted thereon, to contribute to upgrading the design of the roof rack. Specifically, the covering member 600 may be a garnish.

In some forms of the present disclosure, the main body 100 and the hollow profile 200 may be formed of the same material, and the material may be a resin composite. As the main body 100 and the hollow profile 200 of the roof rack according to the present disclosure are formed of the resin composite, the roof rack has an advantage of being made light, compared to the conventional roof rack made of an aluminum material.

Specifically, the resin composite may contain a thermoplastic resin and fiber. Any resin capable of being applied to injection molding may be used as the thermoplastic resin without any special limitation. For example, the thermoplastic resin may include at least one selected from the group consisting of polyethylene (PE), polyamide (PA), polycarbonate (PC), polyethylene terephtalate (PET), polybutylene terephthalate (PBT), acrylonitrile-butadiene-styrene (ABS), and combinations thereof. The thermoplastic resin may preferably be a PA resin, and more preferably a PA6 (nylon6) resin.

Any fiber capable of being used together with a thermoplastic resin to implement excellent strength may be used as the fiber without any special limitation. For example, the fiber may include at least one selected from the group consisting of glass fiber, carbon fiber, synthetic fiber, and natural fiber, and may preferably be glass fiber.

In some forms of the present disclosure, the resin composite may contain 5 wt % to 80 wt % of fiber. Specifically, the resin composite may contain 10 wt % to 75 wt % of fiber, 15 wt % to 70 wt % of fiber, 20 wt % to 65 wt % of fiber, 25 wt % to 60 wt % of fiber, 30 wt % to 55 wt % of fiber, 35 wt % to 50 wt % of fiber, 10 wt % to 70 wt % of fiber, 15 wt % to 65 wt % of fiber, 20 wt % to 60 wt % of fiber, 25 wt % to 55 wt % of fiber, 15 wt % to 75 wt % of fiber, 20 wt % to 75 wt % of fiber, 20 wt % to 70 wt % of fiber, 20 wt % to 75 wt % of fiber, 25 wt % to 80 wt % of fiber, 30 wt % to 70 wt % of fiber, or 35 wt % to 70 wt % of fiber.

Furthermore, the resin composite may additionally contain glass bubble for lightweight of the main body 100 and the hollow profile 200. For example, the resin composite may additionally contain 5 to 40 parts by weight of glass bubble based on a total amount of 100 parts by weight of the resin composite.

In some forms of the present disclosure, to implement desired properties of the parts constituting the roof rack, the type of thermoplastic resin, the type of fiber, and the fiber content may be appropriately selected within the above description.

Specifically, the main body 100 may contain a first resin composite. The first resin composite may contain a PA resin and glass fiber. The first resin composite may contain 10 wt % to 75 wt % of glass fiber, 15 wt % to 70 wt % of glass fiber, 20 wt % to 65 wt % of glass fiber, 25 wt % to 60 wt % of glass fiber, 30 wt % to 55 wt % of glass fiber, 35 wt % to 50 wt % of glass fiber, 10 wt % to 70 wt % of glass fiber, 15 wt % to 65 wt % of glass fiber, 20 wt % to 60 wt % of glass fiber, 25 wt % to 55 wt % of glass fiber, 15 wt % to 75 wt % of glass fiber, 20 wt % to 75 wt % of glass fiber, 20 wt % to 70 wt % of glass fiber, 20 wt % to 75 wt % of glass fiber, 25 wt % to 80 wt % of glass fiber, 30 wt % to 70 wt % of glass fiber, or 35 wt % to 70 wt % of glass fiber.

Furthermore, the hollow profile 200 may contain a second resin composite. The second resin composite may contain a PA resin and glass fiber. The second resin composite may be the same as, or different from, the first resin composite. For example, the second resin composite may contain 10 wt % to 75 wt % of glass fiber, 15 wt % to 70 wt % of glass fiber, 20 wt % to 65 wt % of glass fiber, 25 wt % to 60 wt % of glass fiber, 30 wt % to 55 wt % of glass fiber, 35 wt % to 50 wt % of glass fiber, 10 wt % to 70 wt % of glass fiber, 15 wt % to 65 wt % of glass fiber, 20 wt % to 60 wt % of glass fiber, 25 wt % to 55 wt % of glass fiber, 15 wt % to 75 wt % of glass fiber, 20 wt % to 75 wt % of glass fiber, 20 wt % to 70 wt % of glass fiber, 20 wt % to 75 wt % of glass fiber, 25 wt % to 80 wt % of glass fiber, 30 wt % to 70 wt % of glass fiber, or 35 wt % to 70 wt % of glass fiber.

In particular, in the case of the hollow profile 200, it is important to appropriately select the type of fiber and a fiber content depending on a process condition, for example, extrusion or drawing. For example, when the hollow profile 200 is manufactured by extrusion, the second resin composite may contain glass fiber in the form of short staple fiber or long staple fiber. The second resin composite used for extrusion may contain 10 wt % to 75 wt % of glass fiber, 15 wt % to 70 wt % of glass fiber, 20 wt % to 65 wt % of glass fiber, 25 wt % to 60 wt % of glass fiber, 30 wt % to 55 wt % of glass fiber, 35 wt % to 50 wt % of glass fiber, 10 wt % to 70 wt % of glass fiber, 15 wt % to 65 wt % of glass fiber, 20 wt % to 60 wt % of glass fiber, 25 wt % to 55 wt % of glass fiber, 15 wt % to 75 wt % of glass fiber, 20 wt % to 75 wt % of glass fiber, 20 wt % to 70 wt % of glass fiber, 20 wt % to 75 wt % of glass fiber, 25 wt % to 80 wt % of glass fiber, 30 wt % to 70 wt % of glass fiber, or 35 wt % to 70 wt % of glass fiber. Furthermore, when the hollow profile 200 is manufactured by drawing, the second resin composite may contain glass fiber in the form of continuous fiber, and the second resin composite may contain a glass fiber content that is the same as, or different from, that in the extrusion method. For example, the second resin composite used for drawing may contain 10 wt % to 75 wt % of glass fiber, 15 wt % to 70 wt % of glass fiber, 20 wt % to 65 wt % of glass fiber, 25 wt % to 60 wt % of glass fiber, 30 wt % to 55 wt % of glass fiber, 35 wt % to 50 wt % of glass fiber, 10 wt % to 70 wt % of glass fiber, 15 wt % to 65 wt % of glass fiber, 20 wt % to 60 wt % of glass fiber, 25 wt % to 55 wt % of glass fiber, 15 wt % to 75 wt % of glass fiber, 20 wt % to 75 wt % of glass fiber, 20 wt % to 70 wt % of glass fiber, 20 wt % to 75 wt % of glass fiber, 25 wt % to 80 wt % of glass fiber, 30 wt % to 70 wt % of glass fiber, or 35 wt % to 70 wt % of glass fiber.

In some forms of the present disclosure, the cap 300 may contain a third resin composite, and the third resin composite may contain a PA resin and glass fiber. The third resin composite may be the same as, or different from, the first and second resin composites described above. The third resin composite may contain 10 wt % to 75 wt % of glass fiber, 15 wt % to 70 wt % of glass fiber, 20 wt % to 65 wt % of glass fiber, 25 wt % to 60 wt % of glass fiber, 30 wt % to 55 wt % of glass fiber, 35 wt % to 50 wt % of glass fiber, 10 wt % to 70 wt % of glass fiber, 15 wt % to 65 wt % of glass fiber, 20 wt % to 60 wt % of glass fiber, 25 wt % to 55 wt % of glass fiber, 15 wt % to 75 wt % of glass fiber, 20 wt % to 75 wt % of glass fiber, 20 wt % to 70 wt % of glass fiber, 20 wt % to 75 wt % of glass fiber, 25 wt % to 80 wt % of glass fiber, 30 wt % to 70 wt % of glass fiber, or 35 wt % to 70 wt % of glass fiber.

The present disclosure also relates to a vehicle. The vehicle includes roof racks mounted on a roof panel thereof. Repetitive descriptions of the roof racks identical to ones given above are omitted.

According to the present disclosure, by molding the rail and the support parts provided on the opposite longitudinal end portions of the rail into one main body through injection molding and integrally molding, inside the main body, the hollow profile having the cap mounted on at least one of the opposite longitudinal end portions thereof, the roof rack has advantages of increasing strength and achieving lightweight and cost savings.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A roof rack mounted on a roof panel of a vehicle, the roof rack comprising:
    a main body further comprising:
        a rail extending along a lengthwise direction and configured to form the main body; and
        support parts provided on opposite longitudinal end portions of the rail in the lengthwise direction;
    a hollow profile extending along the lengthwise direction of the rail and integrally formed inside the rail; and
    a cap mounted on at least one of opposite longitudinal end portions of the hollow profile and disposed inside the main body,
    wherein the rail comprises a hollow portion extending along the lengthwise direction, and an inner surface of the rail that forms the hollow portion is in contact with an entire area of an outer surface of the hollow profile.

2. The roof rack of claim 1, wherein the hollow profile is an insert member integrally formed inside the rail through insert molding.

3. The roof rack of claim 1, wherein the hollow profile has one or more through-holes formed in a surface thereof that is opposite the roof panel of the vehicle.

4. The roof rack of claim 1, wherein the hollow profile includes:
    a first rib extending along a lengthwise direction of the hollow profile and connected to an inner surface of the hollow profile across an interior space of the hollow profile along a width direction of the hollow profile; and
    a second rib extending along the lengthwise direction of the hollow profile and connected to the inner surface of the hollow profile across the interior space of the hollow profile along a height direction of the hollow profile.

5. The roof rack of claim 1, wherein the roof rack further comprises:
    pads provided between the support parts and the vehicle.

6. The roof rack of claim 1, wherein the roof rack further comprises:
    covers configured to cover the support parts.

7. The roof rack of claim 1, wherein the main body and the hollow profile are formed of a same material, and
    wherein the same material is a resin composite.

8. The roof rack of claim 7, wherein the resin composite contains a thermoplastic resin and fiber.

9. The roof rack of claim 8, wherein the thermoplastic resin includes at least one of polyethylene (PE), polyamide (PA), polycarbonate (PC), polyethylene terephtalate (PET), polybutylene terephthalate (PBT), acrylonitrile-butadiene-styrene (ABS), or any combinations thereof.

10. The roof rack of claim 8, wherein the fiber includes at least one of glass fiber, carbon fiber, synthetic fiber, or natural fiber.

11. The roof rack of claim 8, wherein the resin composite contains 5 percentage by weight (wt %) to 80 percentage by weight (wt %) of fiber.

12. A roof rack mounted on a roof panel of a vehicle, the roof rack comprising:
    a main body further comprising:
        a rail extending along a lengthwise direction and configured to form the main body; and
        support parts provided on opposite longitudinal end portions of the rail in the lengthwise direction;
    a hollow profile extending along the lengthwise direction of the rail and integrally formed inside the rail; and
    a cap mounted on at least one of opposite longitudinal end portions of the hollow profile and disposed inside the main body,
    wherein the hollow profile includes at least one rib that is configured to divide an interior space into at least two spaces along a lengthwise direction of the hollow profile.

13. The roof rack of claim 12, wherein the rib extends along the lengthwise direction of the hollow profile and is connected to an inner surface of the hollow profile across the interior space of the hollow profile along a width or height direction of the hollow profile.

14. A vehicle comprising:
   a roof rack mounted on a roof panel of the vehicle, the roof rack comprising:
      a main body further comprising:
         a rail extending along a lengthwise direction and configured to form the main body; and
         support parts provided on opposite longitudinal end portions of the rail in the lengthwise direction;
      a hollow profile extending along the lengthwise direction of the rail and integrally formed inside the rail; and
      a cap mounted on at least one of opposite longitudinal end portions of the hollow profile and disposed inside the main body,
   wherein the rail comprises a hollow portion extending along the lengthwise direction, and an inner surface of the rail that forms the hollow portion is in contact with an entire area of an outer surface of the hollow profile.

* * * * *